US008011105B2

(12) United States Patent
Wilson et al.

(10) Patent No.: US 8,011,105 B2
(45) Date of Patent: Sep. 6, 2011

(54) GREEN BEAM LASER LEVEL DEVICE

(75) Inventors: Duard Wilson, Kankakee, IL (US); Ash Puri, West Lafayette, IN (US)

(73) Assignees: Robert Bosch Tool Corporation, Broadview, IL (US); Robert Bosch GmbH, Stuttgart (DE)

( * ) Notice: Subject to any disclaimer, the term of this patent is extended or adjusted under 35 U.S.C. 154(b) by 0 days.

(21) Appl. No.: 12/738,369

(22) PCT Filed: Oct. 31, 2008

(86) PCT No.: PCT/US2008/081990
§ 371 (c)(1),
(2), (4) Date: Jul. 14, 2010

(87) PCT Pub. No.: WO2009/059133
PCT Pub. Date: May 7, 2009

(65) Prior Publication Data
US 2010/0293798 A1 Nov. 25, 2010

Related U.S. Application Data

(60) Provisional application No. 60/985,066, filed on Nov. 2, 2007.

(51) Int. Cl.
G01C 15/02 (2006.01)
G01C 15/14 (2006.01)
(52) U.S. Cl. ........................................... 33/286
(58) Field of Classification Search ............... 33/286, 33/290, 281, 283
See application file for complete search history.

(56) References Cited

U.S. PATENT DOCUMENTS

| 4,333,242 A | * | 6/1982 | Genho, Sr. ............... 33/227 |
| 5,459,932 A | | 10/1995 | Rando et al. |
| 5,539,990 A | * | 7/1996 | Le ............................ 33/283 |
| 6,035,540 A | * | 3/2000 | Wu et al. ................... 33/286 |
| 6,493,952 B1 | | 12/2002 | Kousek et al. |
| 6,694,630 B2 | | 2/2004 | Dang et al. |
| 6,718,643 B2 | * | 4/2004 | Tamamura ................. 33/286 |
| 6,848,188 B2 | * | 2/2005 | Tacklind et al. ........... 33/290 |

(Continued)

FOREIGN PATENT DOCUMENTS

WO    WO 95/33972    12/1995

(Continued)

OTHER PUBLICATIONS

Search Report, dated Mar. 2, 2011, issued in co-pending European patent application 08843527.6.

Primary Examiner — Christopher W Fulton
(74) Attorney, Agent, or Firm — Greer, Burns & Crain, Ltd.

(57) ABSTRACT

A leveling and plumbing device that incorporates: a frame, a body pendulously mounted relative to the frame, a laser module fixed relative to the body so as to be mounted for movement with the body, a beam divider, fixed relative to the laser module as to be mounted for movement with the body, that receive the green light emitted from the crystal and divides the light into at least two beams, including a first beam and a second beam, and first and second line lens, fixed relative to the laser module so as to be mounted for movement with the body, disposed in the path of the first and second beam respectively.

12 Claims, 9 Drawing Sheets

U.S. PATENT DOCUMENTS

| | | |
|---|---|---|
| 6,931,737 B1 | 8/2005 | Liao |
| 7,032,318 B2 * | 4/2006 | Hayes et al. ............... 33/286 |
| 7,134,211 B2 * | 11/2006 | Bascom et al. ............ 33/286 |
| 7,571,546 B1 * | 8/2009 | Sergyeyenko et al. ...... 33/291 |
| 2006/0179672 A1 * | 8/2006 | Tacklind ..................... 33/286 |
| 2006/0196059 A1 * | 9/2006 | Berto .......................... 33/286 |
| 2007/0124947 A1 * | 6/2007 | Munroe et al. ............. 33/286 |

FOREIGN PATENT DOCUMENTS

WO  WO 98/53273  11/1998

* cited by examiner

GREEN BEAM LASER LEVEL DEVICE

BACKGROUND OF THE INVENTION

The present invention relates to improvements in self leveling and plumbing devices.

SUMMARY OF THE INVENTION

One or more embodiments of this invention provides a leveling and plumbing device that incorporates: a frame, a body pendulously mounted relative to the frame, a laser module fixed relative to the body so as to be mounted for movement with the body, a beam divider, fixed relative to the laser module as to be mounted for movement with the body, that receive the green light emitted from the crystal and divides the light into at least two beams, including a first beam and a second beam, and first and second line lens, fixed relative to the laser module so as to be mounted for movement with the body, disposed in the path of the first and second beam respectively. The first line lens is oriented to convert the first beam into a planar level beam and the second line lens is oriented to convert the second beam into a planar plumb beam.

DETAILED DESCRIPTION OF THE ILLUSTRATED EMBODIMENTS

Figure 1A:
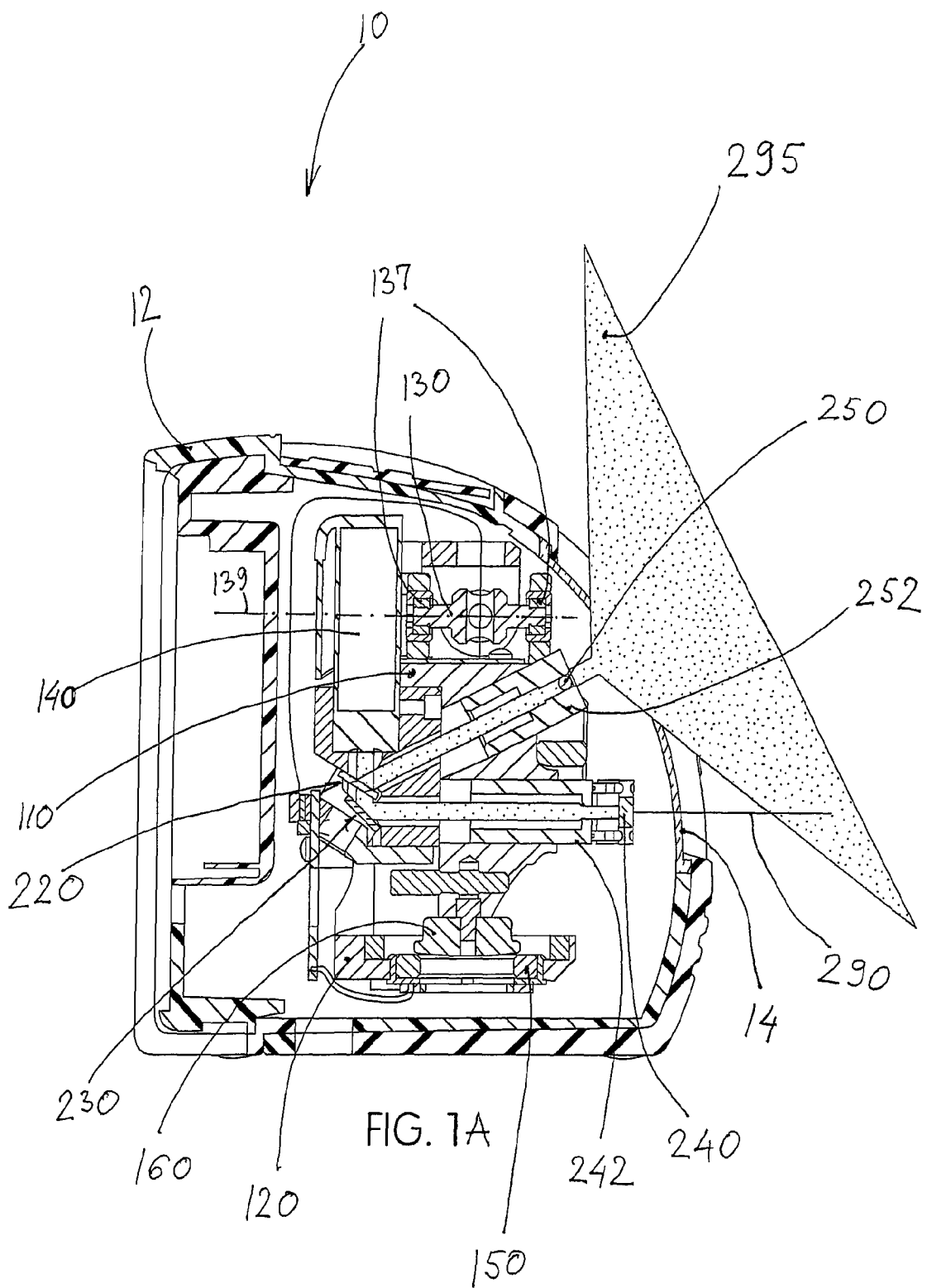
FIGS. 1A-1D are cross-sectional views of a leveling and plumbing device in accordance to one embodiment of the present invention.

An embodiment of leveling and plumbing device 10 in accordance to the present invention is shown in cross-sectional views in FIGS. 1A-1D. The device 10 has an external housing or shell 12, which in one embodiment may be molded from a plastic material. The shell 12 may be formed from two or more shell parts that are secured together. Transparent windows 14 are provided on the housing or shell 12 to enable the laser light to emanate out from the housing 12. Fixedly mounted within housing 12 is a frame 120. A body 110, in the form of self-leveling pendulum assembly is universally, pendulously mounted relative to a frame 120 using a multi-directional swivel attachment 130. The body 110, the frame 120, and the multi-directional swivel attachment 130 are enclosed in the protective housing 12. The window 14 can transmit visible light with no significant distortion of the geometry of transmitted visible light.

Figure 1B:
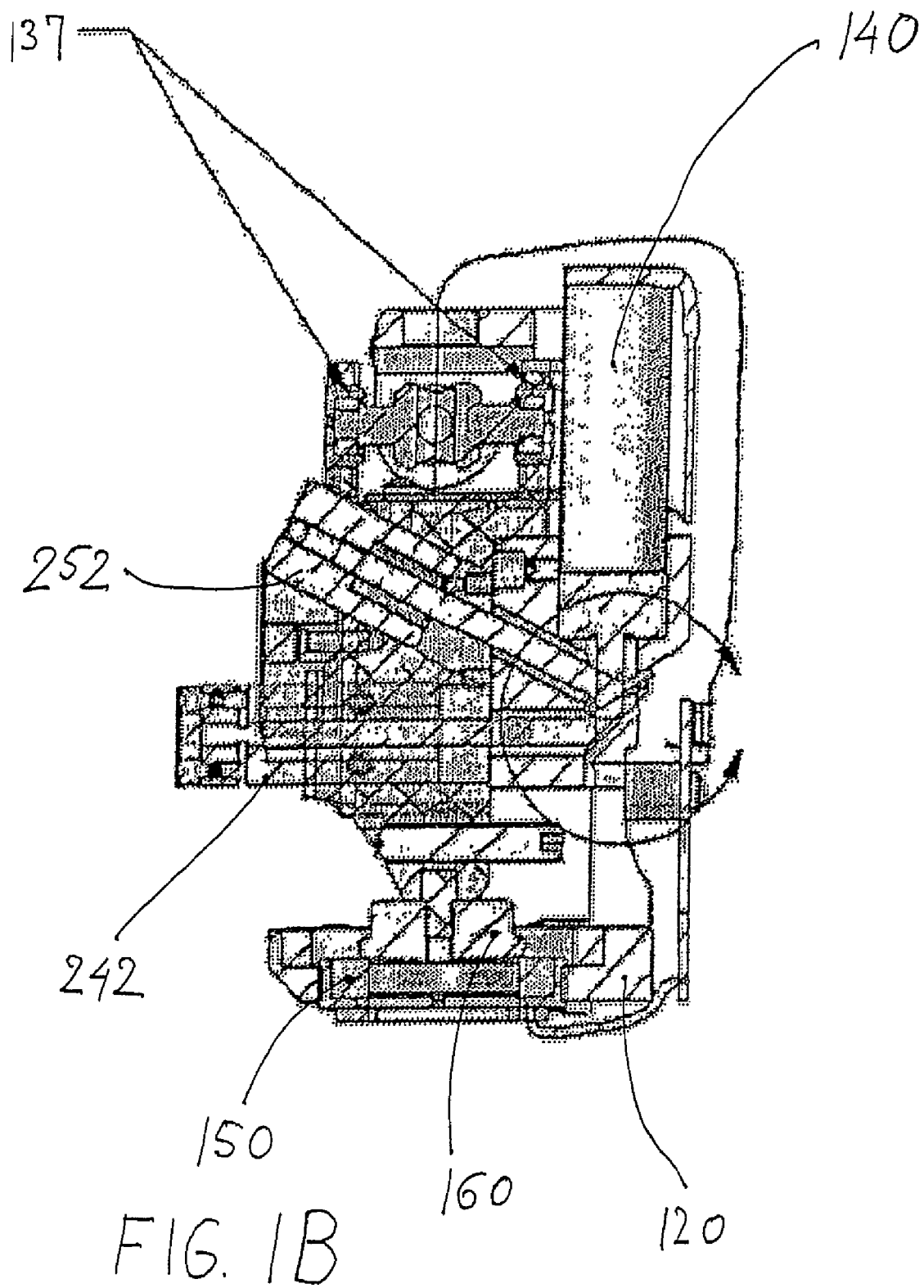
Figure 1C:
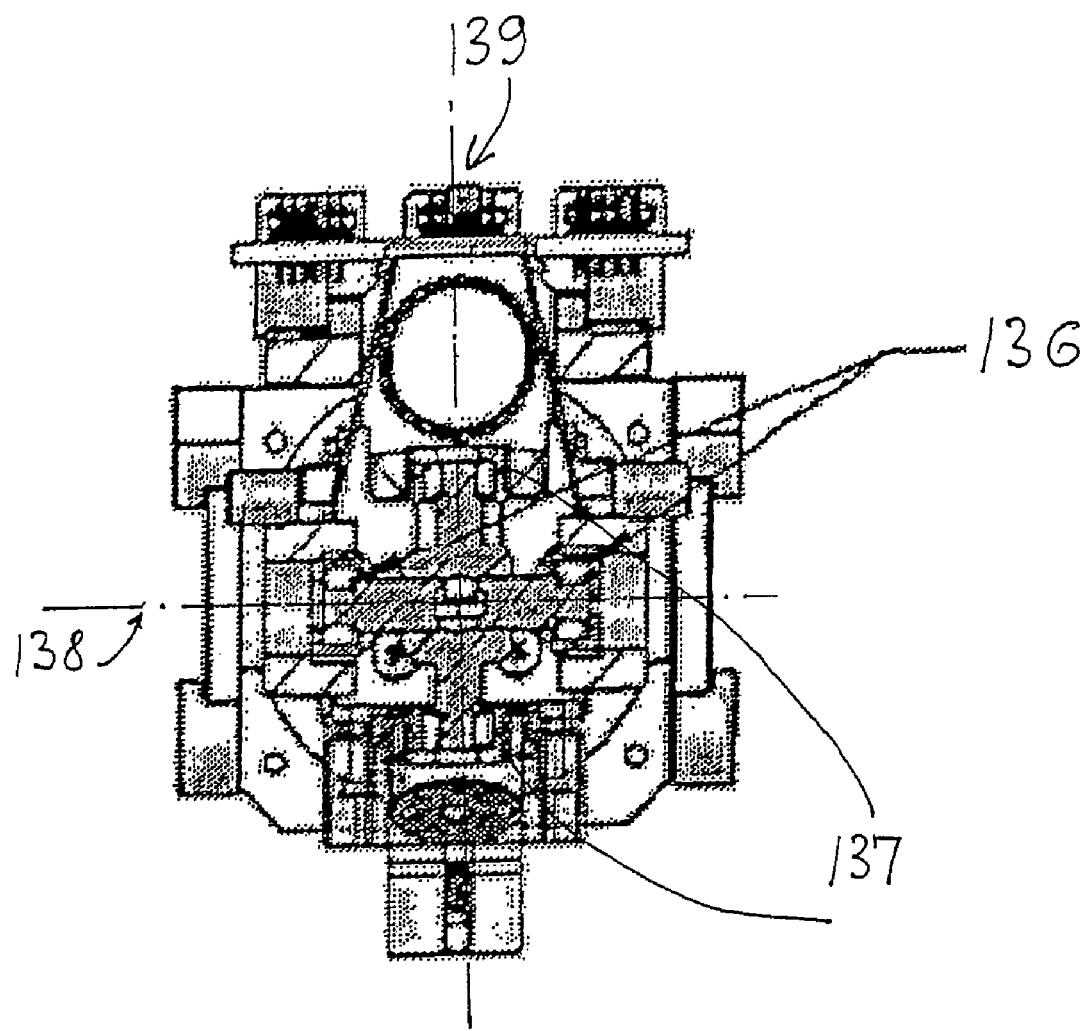
Figure 1D:
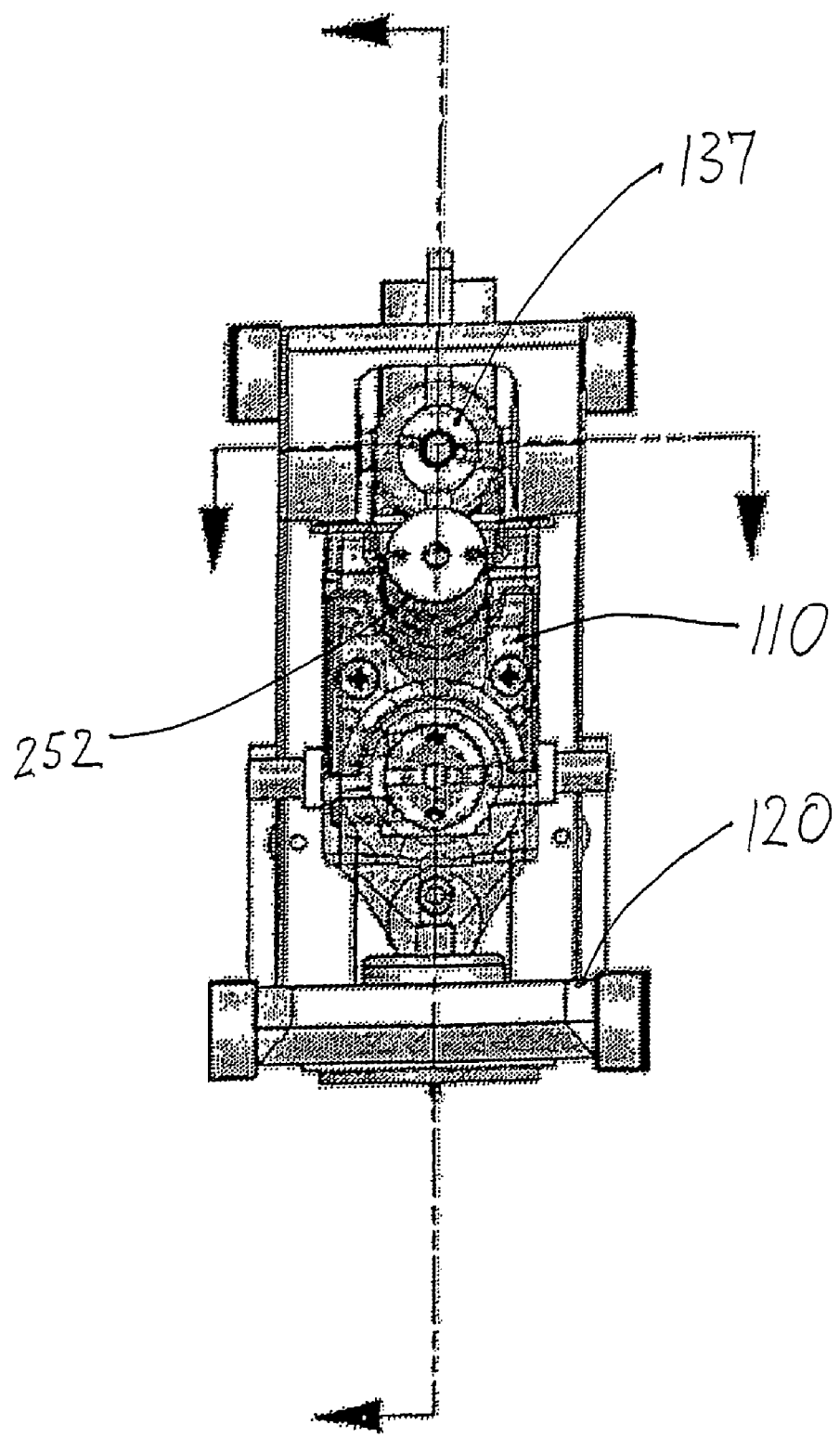

The body 110 and the frame 120 are presented in three orthogonal cross-sectional views in FIGS. 1B-1D. The multidirectional swivel attachment 130 includes two pairs of gimbal bearings 136 and 137 that define two perpendicular axes of rotation 138 and 139. The gimbal bearings 136 and 137 allow for a range of angles of free rotation around the axes 138 and 139 such that the body 110 can swing in any plane perpendicular to the plane defined by the axes 138 and 139.

The body 110 is arranged to assume a predetermined orientation defined by the force of gravity, when placed and appropriately supported by a support structure that can define and sustain a stable support surface whose declination from a horizontal plane does not exceed the range of angles defined by the bearings 136 and 137.

In an alternative embodiment, the body and the frame can have a universally mounted pendulum assembly as a ball and socket arrangement of the type disclosed in U.S. Pat. No. 5,539,990, hereby incorporated by reference in its entirety.

Within the housing 12 is disposed a magnet 150, which in one embodiment is arranged on the frame 120. The magnet 150 is arranged in proximity to a conductive diamagnetic damper 160 attached to the body 110. Swinging of the body 110 around any or both axis 138 and 139 necessarily cause a displacement of the damper 160 relative to the magnetic field of the magnet 150. The velocity of such displacement induces eddy currents in the damper 160. The resistive dissipation of the eddy currents acts as an energy sink for the mechanical energy of oscillations of the body 110. This mechanical energy damping action contributes to the faster stabilization of the body 110 along the local vertical axis. Note that no magnetic force capable to compete with the force of gravity is acting on the body 110 when the body is not moving relative to the magnet 150, as known to the skilled in the art. It should be appreciated that while body 110 may be formed from a single integral structure, in most embodiments it will be formed from several different portions secured together. The body 110 may be formed from metal, plastic, elastomeric material, ceramic, glass, or any combination thereof.

A laser module 140 is incorporated and fixed to the body 110, so as to be mounted for movement with the body 110. The orientation of the laser module 140 is defined and accurately known relative to the body 110, such that, when under force of gravity the body assumes the predetermined orientation, the orientation of the laser module 140 can be measured and accurately set during manufacture with respect to the orientation of the local force of gravity. In one embodiment, the laser module 140 is fixed relative to body 110 such that it will be oriented essentially such that when the body 110 is at rest under the force of gravity, the beam emitted from the module 140 is directed in a direction substantially parallel to a vector representing the local force of gravity.

Figure 2A:
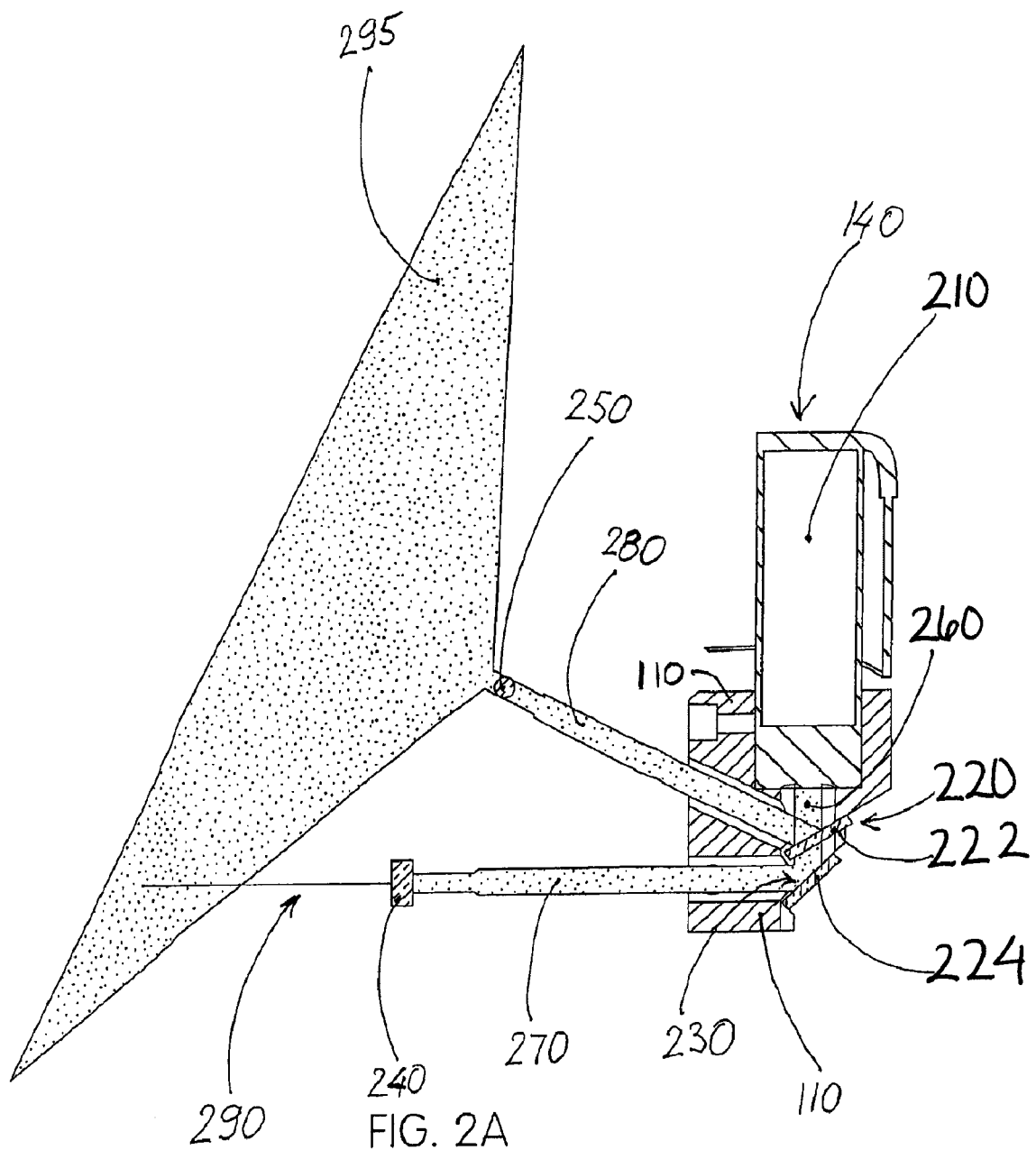
FIGS. 2A-2C are a cross-sectional, a perspective, and a front view of a leveling and plumbing device in accordance to one embodiment of the present invention.
Figure 2B:
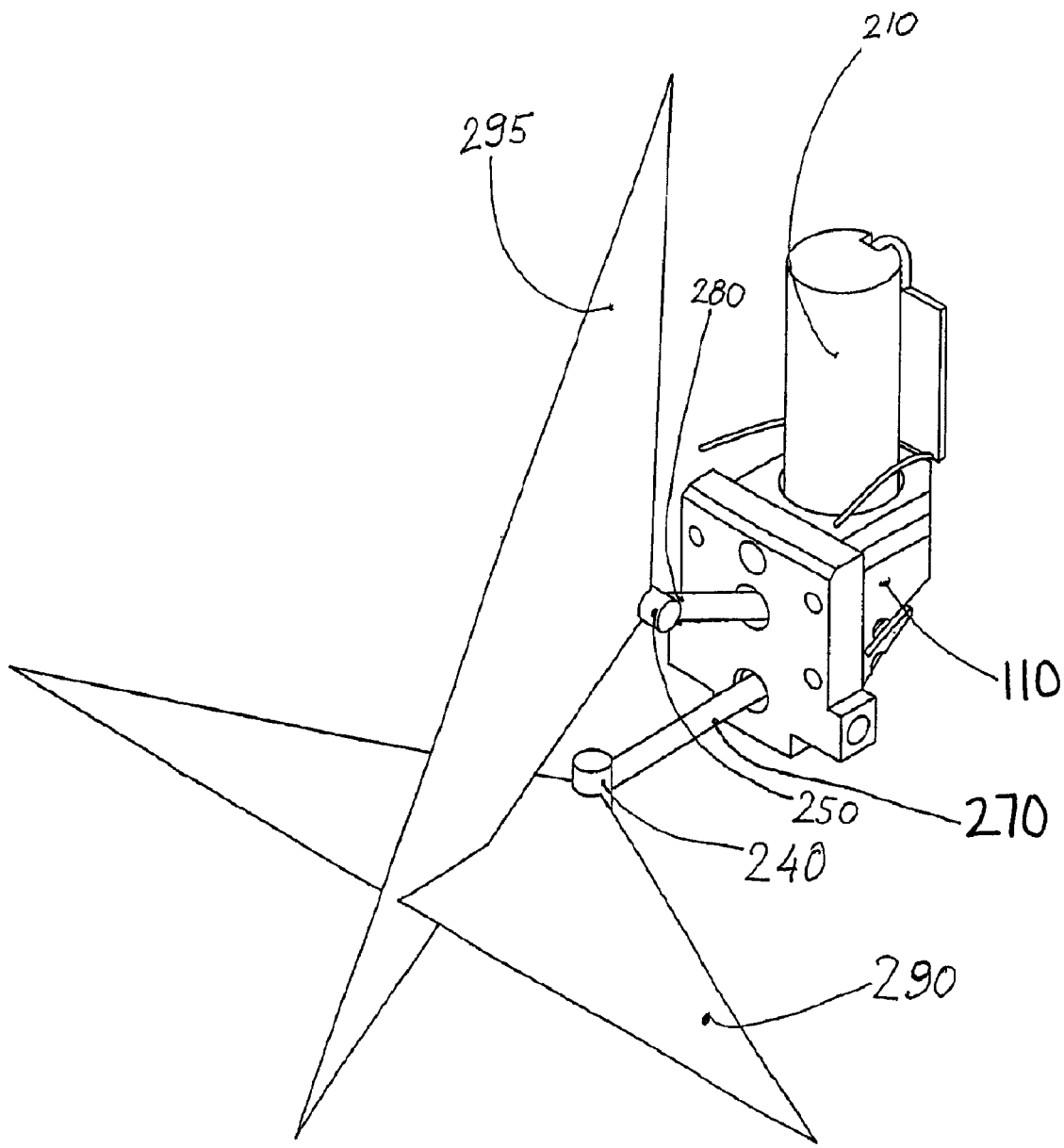
Figure 2C:
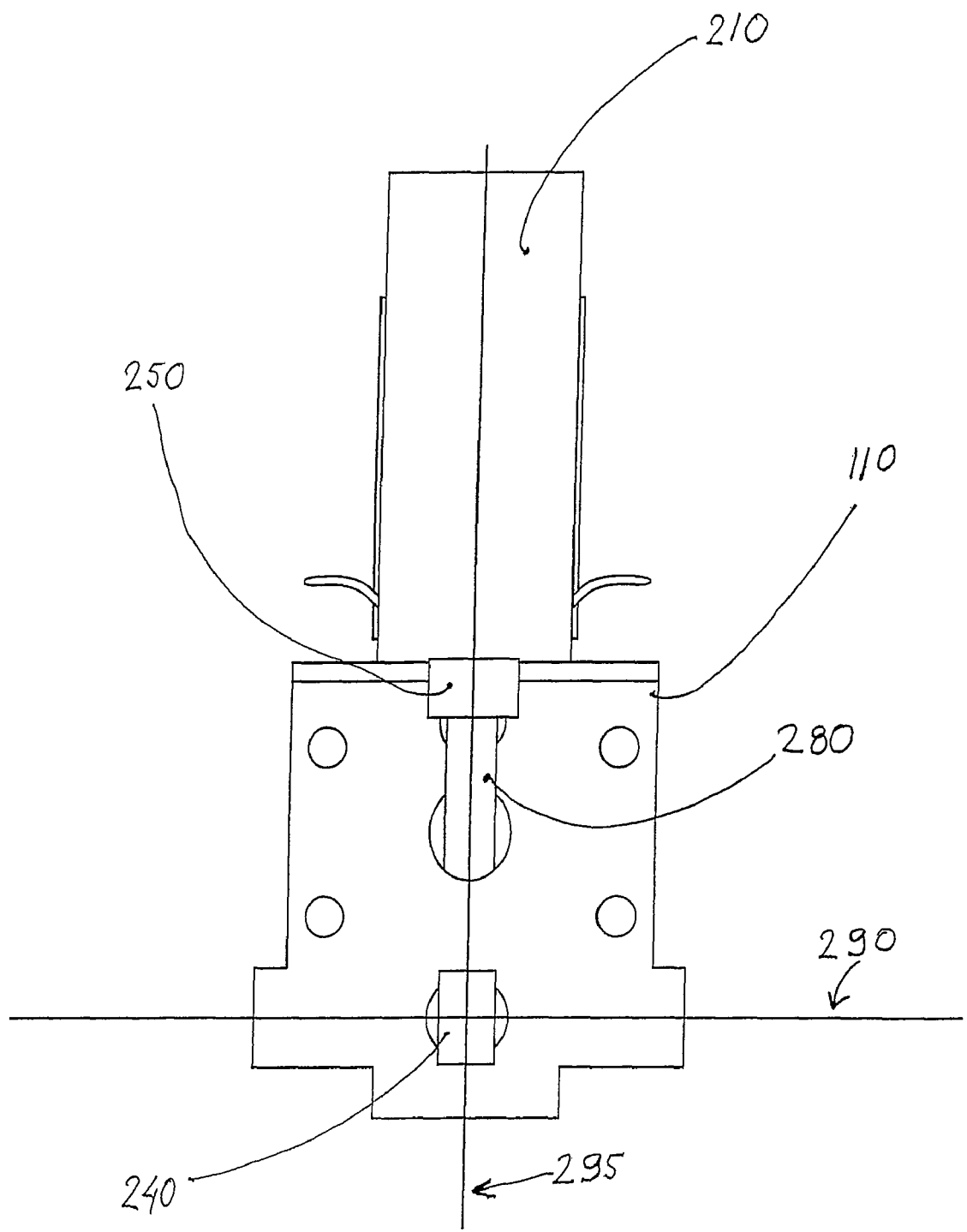

The laser module 140 is shown in FIGS. 2A, 2B, and 2C in a cross section, a perspective view, and a front view respectively. The laser module 140 includes a green light source 210. The device future includes a beam divider 220, a first line lens 240, and a second line lens 250. The beam divider 220 splits the light beam 260 emitted by the green light source 210 into a first beam 270 and a second beam 280. In one embodiment, as shown, the beam divider 220 comprises a beam splitter 222. the beam splitter 222 may be a partially reflecting mirror (e.g., a 50% reflective/50% transmissive mirror). In such embodiment, one of the two beams may be reflected by a reflective surface 230. For example, in the illustrated embodiment, it is the transmitted portion 270 of the beam (i.e., the portion of the beam that passes through the beam splitter 222) that is reflected by the reflective surface 230. In one embodiment, the reflective surface 230 is provided by a 100% reflective mirror 224.

It should be appreciated that in other embodiments, the beam divider 220 may use other components, such as prisms, polarizing beam splitters, lenses, and mirrors with openings or angled reflective surfaces to divide the incoming single beam into two beam portions. In addition, an another embodiment, other arrangements for redirecting light can be provided other than mirror 224 (e.g., prisms, light pipes, optical fibers, lenses, etc.) Thus, rather than the light being reflected or transmitted by the beam divider 222 and or by the reflective surface 230, it may simply be considered to be redirected.

The first beam 270, which passes through the beam splitter 222, is reflected by the reflective surface 230 in the direction of the first line lens 240, arranged to intercept the first beam 270, The second beam 280, which is directed by the beam divider 260 in the direction of the second line lens 250, arranged to intersect the second beam 280. The first line lens 240 is oriented to refract the light of the first light beam 270 and convert the first beam 270 into a planar level beam 290. The second line lens 250 is oriented to refract the light of the second light beam 280 and convert the first beam 280 into a planar plumb beam 295.

Figure 3A:
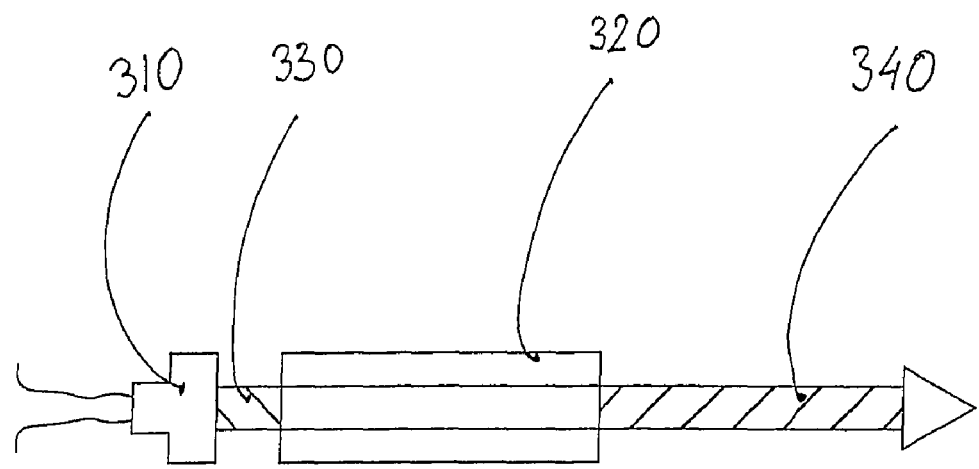
FIGS. 3A-3B are schematic representation of a laser module in accordance to one embodiment of the present invention.
Figure 3B:
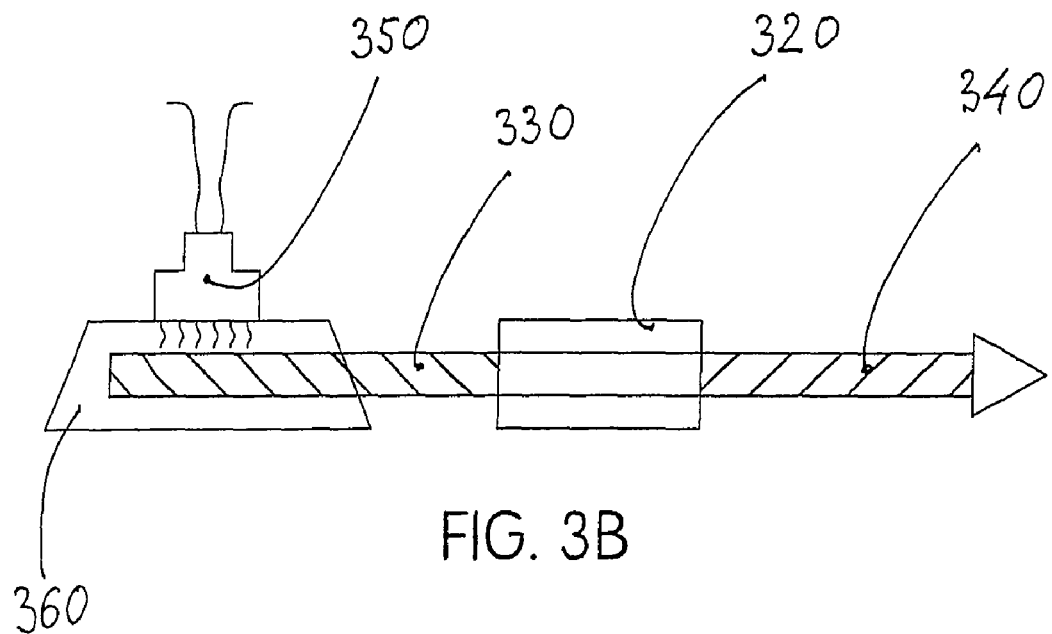
Figure 4:
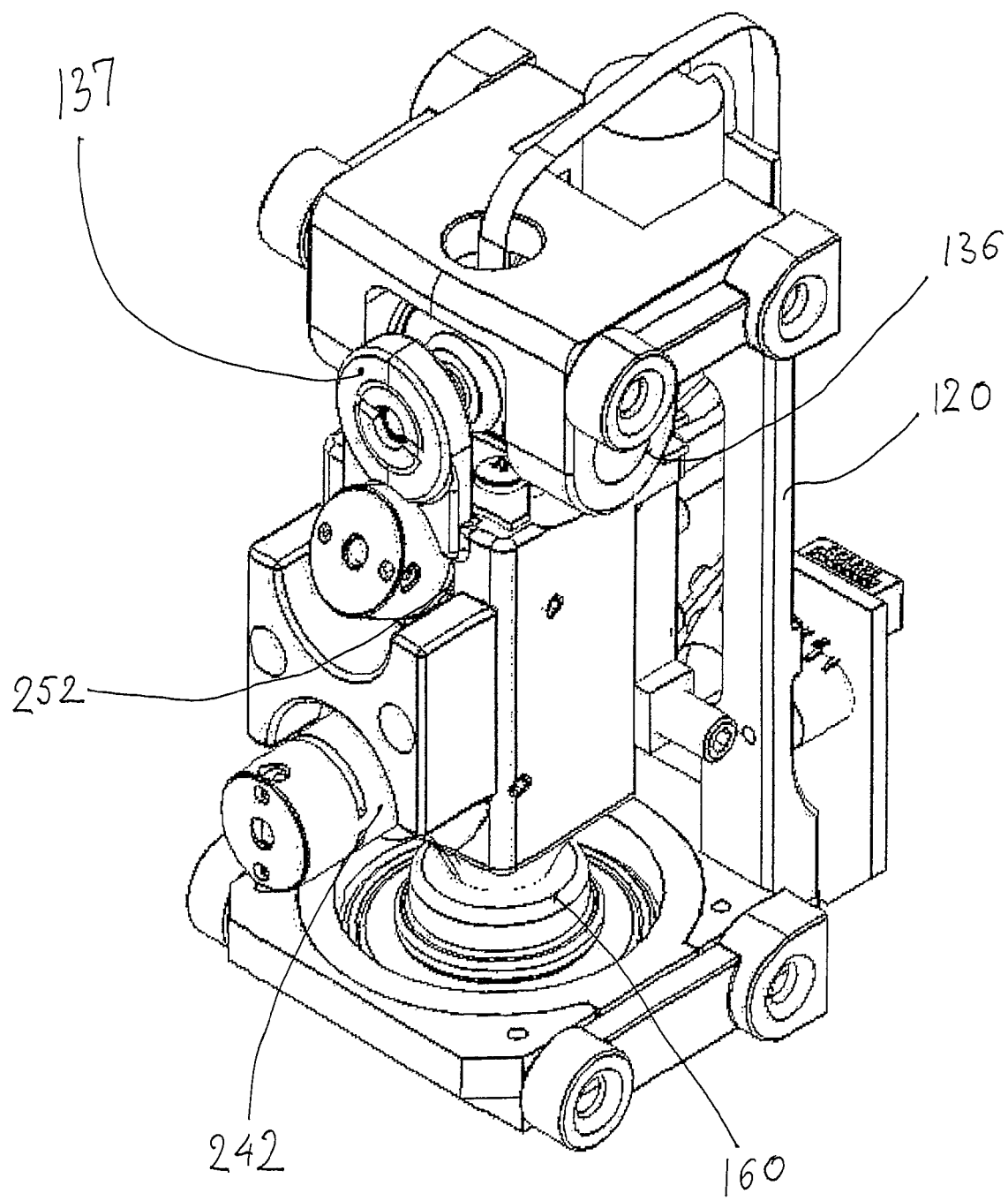
FIG. 4 is a perspective view of a leveling and plumbing device in accordance to one embodiment of the present invention.

The green light source is shown schematically in FIGS. 3A-3B. In one embodiment schematically represented in FIG. 3(a), a diode laser 310, comprising individual laser diode or arrays of laser diodes, is arranged to emit infrared laser beam 330 through a wavelength converting crystal 320. The wavelength converting crystal 320 is arranged to absorb the impinging light and re-emit the absorbed energy in the form of the light having shorter wavelength than the wavelength of the impinging light. When the diode laser is chosen to emit in the frequency range of approximately 990 nm-1140 nm and the wavelength converting crystal is a frequency doubler, such as a Potassium Titanyl Phosphate (KTP) crystal, the beam 340 emitted by the light source 210 will have wavelength approximately in the range of 495 nm-570 nm characteristic for the green visible light. The green light, having the wavelength from the 495 nm-570 nm range, exhibits luminous efficacy of at least 140 lm/W.

In another embodiment shown schematically in FIG. 3(b) at least one diode laser 310 is used to optically pump a solid state laser crystal 360. When the diode laser is chosen to emit in the optical pumping wavelength range of 800 nm-900 nm, and the solid state laser crystal is arranged to efficiently absorb the optical pumping radiation, such as Neodymium-doped Yttrium Orthovanadate (Nd:YVO4) or Neodymium-doped Yttrium Aluminum Garnet (Nd:YAG) the infra-read laser beam 330 will have approximate wavelength of 1064 nm. If the wavelength converting crystal is a frequency doubler, such as a Potassium Titanyl Phosphate (KTP) crystal, the output beam 340 emitted by the light source 210 will have approximate wavelength of 532 nm, exhibiting luminous efficacy of at least 570 lm/W.

In the embodiment shown in FIGS. 1-2C the line lenses 240 and 250 may each take the form of cylinder lens. The cylinder lens may have an optical surface approximating a surface of a cylinder with circular cross section, or a partial cylinder (e.g., having a semi-circular cross section).

In another embodiment, other line lenses may be used. For example, lenses and/or mirrors with elliptical cross-sections or other aspheric lenses or mirrors with compounded radius of curvature cross sections can be used. In one embodiment, each line lens may correspond to the lens disclosed in U.S. Publication No. U.S. 2007/0124947 (Ser. No. 11/585,931), entitled "Light-Plane Projecting Apparatus And Lens", hereby incorporated by reference in its entirety. It is also worth noting that combinations of similar or different optical elements individually or in arrays can also be used to create intersecting planar level beam 290 and planar plum beam 295.

In the illustrated embodiment, a pair of set screws 170 is provided for each cylinder lens. Tensions on the set screws 170 are individually adjusted to control the angles between the cylindrical axis of the lenses and axis of propagation of the respective laser light beams. The angle between the cylindrical axes of the lens and the axis of propagation of the corresponding green light beam are arranged to be approximately 90° in order to prevent distortions of planar level beam 290 and planar plum beam 295.

In the illustrated embodiment, each of the line lenses 240, 250 is arranged at the end of an associated lens holder 242 and 252, respectively, that is fixed to the body 110. In one embodiment, the lens holders 242 and 252 each comprise respective tubular structures that receive light that has been divided by light divider 220, and allows the incoming associated beams 270 and 280 to pass freely therethrough. The end of the tubular structures provide mounts for mounting the respective lenses 240 and 250. The tubular structures may comprise an empty or void region therein, or may in another embodiment comprise fiber optic or other light transmissive material. In another embodiment, the holders 242 and 252 can be considered to be part of the body 110, wherein the body 110 has void regions (empty space) that allows the light that has been divided by light divider 220 to pass therethrough unimpededly.

FIGS. 1-2C depict the embodiment where the beam divider 220 is a partially reflecting mirror while the reflecting surface 230 is a fully reflective front surface mirror. It known to the practitioners of optics that the beam divider 220 in accordance to the present invention can also be arranged in the form of polarizing beam splitter, dichroic beam splitter, or light reflectors with a single or multiple holes or openings as long as the resulting first beam 270 and second beam 280 exhibit comparable light intensities for convenient simultaneous observation of illuminated objects.

The embodiment depicted in FIGS. 1-2C utilizes mirror 230 with multiple dichroic coatings for efficient reflection of light with wavelength in the vicinity of 532 nm.

What is claimed is:

1. A leveling and plumbing device, comprising:
   a frame;
   a body pendulously mounted relative to the frame;
   a laser module fixed relative to the body so as to be mounted for movement with the body, the laser module comprising a diode laser and a crystal, wherein light is emitted from the diode and passes through the crystal, the crystal converts a wavelength of the light emitted from the diode laser so that light emitted from the crystal is within the green light spectrum;
   a beam divider, fixed relative to the laser module as to be mounted for movement with the body, that receive the green light emitted from the crystal and divides the light into at least two beams, including a first beam and a second beam;
   a first line lens, fixed relative to the laser module so as to be mounted for movement with the body, the first line lens disposed in the path of the first beam;
   a second line lens, fixed relative to the laser module so as to be mounted for movement with the body, the second line lens disposed in the path of the second beam;
   wherein the first line lens is oriented to convert the first beam into a planar level beam and the second line lens is oriented to convert the second beam into a planar plumb beam.

2. A leveling and plumbing device according to claim 1, wherein the first line lens comprises a surface defining at least part of a cylinder, and the second line lens comprises surface defining at least part of a cylinder.

3. A leveling and plumbing device according to claim 1, wherein at least one line lens is an aspheric lens.

4. A leveling and plumbing device according to claim 1, wherein the beam divider is a partially reflective mirror.

5. A leveling and plumbing device according to claim 1, wherein the beam divider is a dichroic beam splitter.

6. A leveling and plumbing device according to claim 1, wherein the beam divider is a polarizing beam splitter.

7. A leveling and plumbing device according to claim 1, wherein the beam divider is arranged to create at least two light beams with substantially equal luminosity.

8. A leveling and plumbing device according to claim 1, wherein the body comprises a self-leveling pendulum assembly.

9. A leveling and plumbing device according to claim 1, further comprising a solid-state laser crystal;
wherein the diode laser is a pumping laser comprising at least one laser diode such that light is emitted from the pumping laser and passes through the solid-state laser crystal until at least a portion of pumping laser light is absorbed; the solid-state laser crystal emits a beam of light that passes through the wavelength converting crystal that converts a wavelength of at least a portion of the light emitted by the solid state laser crystal so that light emitted from the wavelength converting crystal is within the green light spectrum.

10. A leveling and plumbing device according to claim 1, further comprising a reflective surface, wherein the first beam is reflected by the beam splitter and directed to the first line lens, and wherein the second beam passes through the beam splitter and is reflected by the reflective surface and thereby directed to the second line lens.

11. A leveling and plumbing device according to claim 1, wherein the laser module is oriented generally vertically, and the beam splitter and the reflective surface redirect the first and second beam in a generally horizontal direction prior to impinging upon the first and second line lens, respectively.

12. A leveling and plumbing device according to claim 1, further comprising first and second lens holders that hold the first and second line lens in a spaced relation from the beam divider and the reflective surface.

* * * * *